INVENTOR.
ALEXANDER WOLF
BY
ATTORNEY

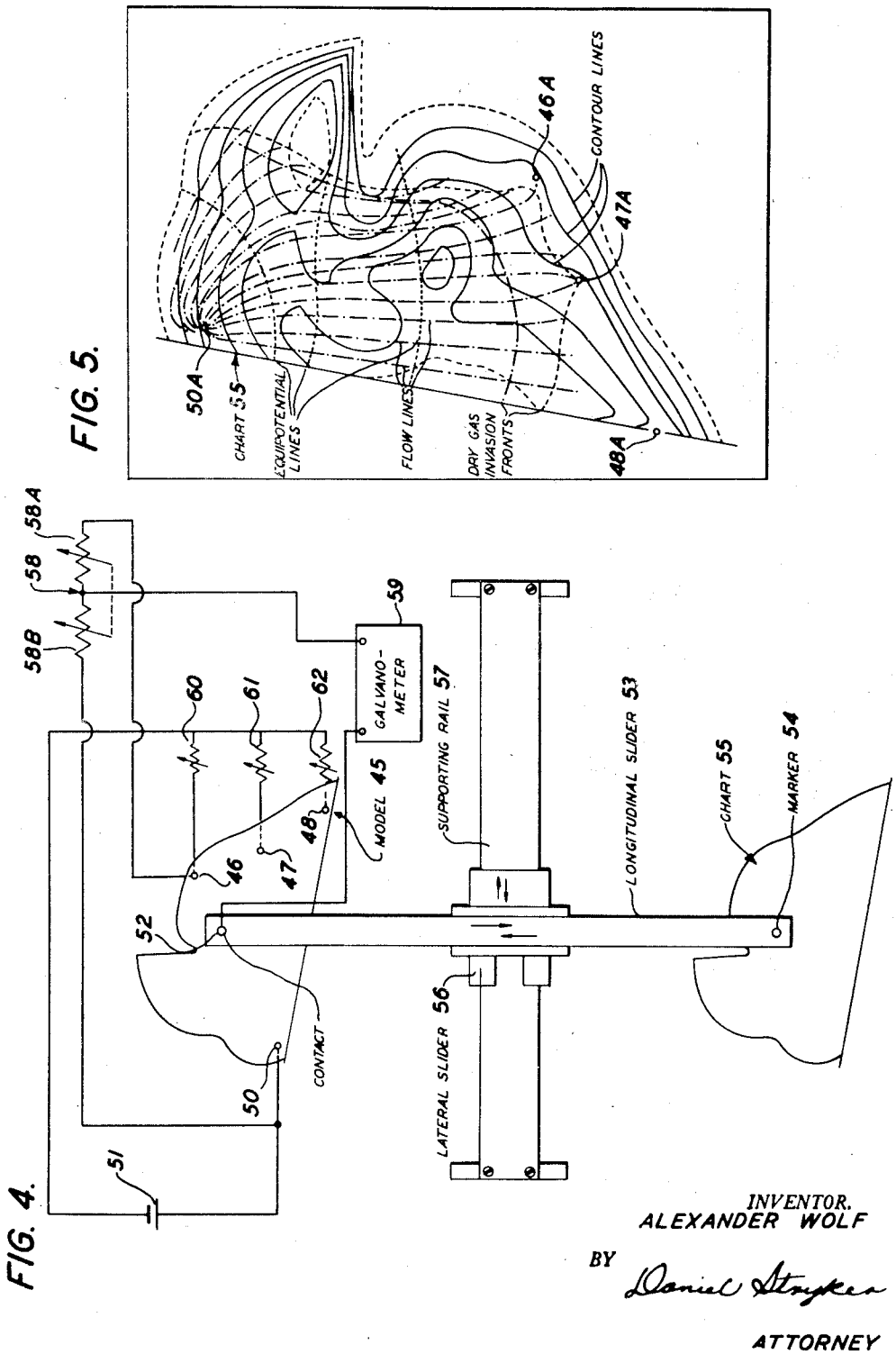

Patented Oct. 2, 1951

2,569,510

UNITED STATES PATENT OFFICE 2,569,510

ELECTRICAL ANALOGUES

Alexander Wolf, Houston, Tex., assignor to The Texas Company, New York, N. Y., a corproation of Delaware Application December 15, 1947, Serial No. 791,797

1 Claim. (Cl. 346—139)

This invention is concerned with the analysis of mechanical and electrical systems which obey Laplace's equation. It finds a variety of applications, including production control from underground fluid reservoirs, such as oil and gas fields.

Ohm's law for the flow of electrcity is expressed by the equation $$I = -\frac{1}{p} \cdot \frac{\delta E}{\delta x} \qquad (1)$$

where $I$ is the current flowing through the unit of area of a section whose specific resistivity is $p$, and across which there is a voltage gradient $$\frac{\delta E}{\delta x}$$

($x$ is normal to the area).

Darcey's law for the flow of fluids through porous media is $$V = -\frac{k}{\mu} \cdot \frac{\delta p}{\delta x} \qquad (2)$$

where $V$ is the rate of flow of a fluid whose viscosity is $\mu$ through a unit area of a section having a permeability $k$, and across which there is a pressure gradient $$\frac{\delta p}{\delta x}$$

($x$ is normal to the area).

The two laws are identical when $$\frac{1}{p}$$

the reciprocal of specific resistivity, is made numerically equal to the ratio of permeability to viscosity, in which case fluid flow becomes directly comparable to current flow and electrical potential becomes directly comparable to pressure.

Electricity, if it be likened to a moving fluid, is incompressible. Consequently Ohm's law (Equation 1) may be combined with the equation of continuity for an uncompressed or incompressible fluid (i. e. one which does not suffer change in volume). The equation can be expressed as follows, for the flow of electricity $$\frac{\delta I}{\delta x} \text{ and } \frac{\delta I}{\delta y} \text{ and } \frac{\delta I}{\delta z} = 0 \qquad (3)$$

where $x$, $y$ and $z$ are the coordinates of a three dimensional space taken at right angles to each other.

If Equations 1 and 3 are combined, the result is Laplace's equation, viz.

$$\frac{\delta^2 E}{\delta x^2} \text{ and } \frac{\delta^2 E}{\delta y^2} \text{ and } \frac{\delta^2 E}{\delta z^2} = 0 \qquad (4)$$

This equation governs the flow of electricity in a homogeneous isotropic conducting medium, but in view of the analogy between the flow of a fluid (which does not suffer change in volume) in a porous media and the flow of electricity in the conductor, it may be taken as governing such fluid flows as well, i. e. the flow of electricity is analogous to the flow of fluids if the fluid is considered either as incompressible or uncompressed.

There are a number of engineering problems involving the investigation of steady-state dynamic systems in which force distribution can be expressed in terms of electrical potentials and in which Laplace's equation, as a practical approximation, may be considered as controlling. It has been proposed heretofore, to solve some of these problems (particularly that involving fluid flow in a porous medium) by constructing an electrical analogue. Such an analogue may take the form of a conductive model, say a pool of electrolyte, the shape of which is analogous to the system to be investigated, exterior forces operating upon the system being represented in the analogue by electrical potentials imposed across the model. The conductor of the model may be of the electronic type, i. e. a conductive solid. Electrons are introduced at one or more points in the model and displace free electrons throughout the conductor, so that electrons are forced to move out at another point, with resultant current flow. The conductor may also be of the ionic type, say a pool of electrolyte or an electrolyte dispersed in a body of gel, current flow being dependent upon the mobility of ions through the conductor, but with current flow and potential drop established in the conductor just as in the electronic conductors.

In both types of conductors, potential and potential gradients may be determined by means of probes in contact with the points in question and connected to a potential measuring device such as a galvonometer. However, the collection of data by such means heretofore has been tedious and time consuming, with the result that electrical analogues for solution of problems of the type described have not been employed to the fullest extent.

The exploitation of an oil or gas field may be accomplished either by the expansion of the gas and oil in the producing formation, by displacement of the gas and oil by another fluid, or by simultaneous expansion and displacement. Whenever the displacement of the oil or gas is the controlling factor there arises the problem of mapping the progress of the boundary between the fluid in place and the displacing fluid. This problem is of particular interest in the operation of a cycling project in a gas-condensate field. In such an operation "wet" gas may be produced from one or more wells which are commonly called extraction or output wells. The wet gas is sent to a processing plant where liquid condensate is removed. The "dry" gas remaining after removal of the liquid condensate is injected back into the producing formation through one or more wells, called injection or input wells, both to conserve the gas for future use and also to maintain the pressure in the field. In such a cycling operation it is essential to anticipate the manner in which the dry gas will spread through the field, because the ultimate recovery of wet gas, and therefore of valuable liquid products, depends largely on keeping the dry gas from breaking into the extraction wells until substantially complete production of wet gas has been achieved. It is thus necessary to know the shape of the boundary or fluid interface between the wet and the dry gas around the injection wells for various arrangements of wells and for various injection and extraction rates, so that a scheme can be selected which will postpone this break-through to the latest possible date while maintaining a given rate of extraction and thereby permit the maximum recovery of wet gas. After break-through of dry gas into an extraction well has occurred, it then may be necessary to determine the expected proportion of dry gas which will be mixed with the wet gas produced by the well.

Exploitation problems of the type described above and the application of electrical analogues to the solution thereof are discussed by Muskat in his book "The Flow of Homogeneous Fluids through Porous Media." Unfortunately the mathematical solution of the type of problem outlined above can be carried out only for certain idealized arrangements of injection and extraction wells, and then only for the simplest of boundary conditions. The mathematical solution for the well arrangements and boundaries which are encountered in actual practice is entirely impractical because of the excessive labor involved. The only feasible approach to the solution of these problems is through the use of models on a reduced scale. These models need not actually employ a porous medium and a fluid. As pointed out above, there exists, with certain assumptions, an exact analogy between the flow of fluid in a porous medium and the flow of electrical current in a conducting body of similar geometry.

If electrical currents proportional to the rates of injection and extraction of fluid are passed through such a conductor by means of electrodes located at points corresponding to the positions of the wells in the field, then the electrical potential distribution in the conductor is exactly analogous to the fluid pressure distribution in the field, and the current flow lines correspond to the fluid flow lines in the field. The study of fluid flow in an oil field is thus reduced to a study of current flow in an electrical conductor of suitable shape.

In making studies on electrical models employing electrolytic solutions the mapping of the fluid interface may be carried out by either of two different known methods. The first of these methods, which has been applied quite widely, is by means of the ionic conduction or so-called electrolytic model. The electrolytic model consists essentially of an aqueous solution of an electrolyte held in a suitable porous medium to prevent excessive velocities on the part of the ions due to normal diffusion. The electrolyte may be any ionizable salt. The porous medium may be ordinary blotting paper or cardboard, or may be a hydrophilic gel made from gelatin, agar-agar, or similar colloidal substances.

A color tracer is added to the electrolytic system to permit visual observation of the progress of the ions between the points of different electrical potential in the system. The color tracer may be a hydrogen ion indicator, such as phenolphthalein, contained in the electrolyte solution, in which case the negative electrodes represent the fluid source or injection wells in the corresponding flow system and the positive electrodes represent the extraction wells. The advance of negative ions as revealed by a color change of the indicator corresponds to the advancing fluid interface in the producing formation. In place of an indicator a colored ion may be injected into the system at the electrode corresponding to the injection well. In such a case a colorless solution of zinc-ammonium chloride may be employed as the electrolyte in the porous medium and a solution of copper-ammonium chloride may be injected at the positive electrodes. The progress of the blue copper-ammonium ions from the positive to the negative electrodes corresponds to the advancing fluid interface in the formation. The progress of the equivalent fluid interface may be observed and recorded by making photographs of the position of the colored areas of the model at various time intervals after the experiments are begun.

The electrolytic model gives the desired results quite rapidly but with inferior accuracy due to a loss of sharpness of the boundaries of the fluid interface as the pattern spreads. It has been shown that the total effect of the several inherent errors of the electrolytic method may result in an overall error of as much as 25% in the determination of the volume of the formation flooded by individual injection wells. In view of this the results obtained with the electrolytic model are generally considered to be of a qualitative nature or at best only semi-quantitative.

A second method for carrying out such studies is by means of the electrical conduction or so-called potentiometric model. This model consists ordinarily of a pool of a conducting liquid, such as a dilute solution of copper sulphate in water. The bottom of the conducting pool is shaped such that the depth of the conducting liquid at any point corresponds to the actual quantity of oil or gas contained in the producing sand at the corresponding point in the formation. The periphery of the conducting pool is shaped to correspond to the geometrical boundaries of the formation. The necessary information for the construction of the conducting pool is obtained from an isopachous map of the formation on which the contour lines of equal sand thickness have been converted to represent actual oil content by correcting for sand volume and connate water content. For practical reasons the reduction in scale is much larger in the horizontal than in the vertical direction.

At points corresponding to the location of the various wells in the field vertical metallic electrodes are introduced into the pool, usually through the bottom so as not to interfere with the measurements. Through these electrodes electric currents are passed into and out of the pool, the flow of current being either into or out of the pool depending upon whether the well represented is an injection or extraction well, and the magnitude of the currents being proportional to the fluid injection and extraction rates which are employed or which it is proposed to employ in the exploitation of the field. As already mentioned, the direction of current flow at any point in the conducting pool is then identical to the direction of fluid flow at the corresponding point in the oil-bearing formation, and the potential gradient at any point in the conducting pool is proportional to the pressure gradient at the corresponding point in the formation. Any element of fluid in the formation follows a path corresponding to a current flow line in the conducting pool and the transit time for such element of fluid from one point to another in the formation is proportional to the line integral $$\int \frac{\delta x}{\delta P} dx$$

taken along a flow line in the formation, where $x$ is the travel distance and $P$ is the pressure. Hence the transit time for any element of fluid in the formation is also proportional to the line integral $$\int \frac{\delta x}{\delta V} dx$$

taken along a current line in the conducting pool, where $x$ is the corresponding travel distance in the pool and V is the potential.

The problem of mapping the progress of an interface between the driving and the driven fluids is essentially the problem of determining these integrals along all of the current lines in the electrically conducting pool. The potentiometric method, however, has not been employed extensively, because heretofore the means for obtaining the line integrals have been too cumbersome for practical application. The method which has been employed previously for arriving at fluid travel time by means of potentiometric model studies is tedious and time consuming.

Application of my invention to oil field exploitation problems permits the collection of accurate data in but a small fraction of the time heretofore involved, this being only one of a number of types of problems in which the invention offers advantages. Thus I have developed a mechanism which greatly facilitates the collection and utilization of data with electrical analogues of steady-state systems that are governed, at least approximately, by Laplace's equation. The invention, in essence, contemplates the combination which comprises a three dimensional electrically conductive model analogous to the system to be investigated, a chart (say one corresponding to a plan of the model), means for establishing across the model a current analogous to force operating upon the system, a conductive probe disposed in contact with the model, means for determining the potential of the probe, a marker disposed adjacent the chart, and a linkage connecting the marker to the probe for moving the marker on the chart to correspond to movements of the probe on the model.

The linkage may take only one of a number of forms, for example, an arm connecting the probe to the marker and supporting means which permit the arm to be moved both longitudinally and laterally, say in a plane parallel to that of the chart. It may also take the form of a combination of levers arranged as a pantograph connecting the probe to the marker, so that movement of one produces a corresponding movement of the other.

The probe member may have but a single electrical contact, with a corresponding single tracing point on the marker. Preferably (as disclosed in co-pending application Serial No. 674,904, filed June 6, 1946, now abandoned) multiple contacts are provided on the probe, with corresponding multiple tracing points on the marker, the linkage being such that the tracing points move on the chart to correspond to the movements of the contacts on the model. Thus, for example, if it is desired to plot lines of equipotential in the model, the probe may be equipped with a rotatable head upon which a pair of contacts are fastened in spaced relationship. Similarly the marker member is provided with a rotatable head, provided with a pair of tracing points spaced to correspond to the contacts, the axes of rotation of the two heads bearing similar relationships respectively to the model and the chart. The mechanical linkage is such that the two heads move in unison and correspondingly respectively over model and chart and rotate correspondingly so that when the contacts are on an equipotential line in the model, with no potential difference indicated by a galvanometer connected across them, a corresponding line will be indicated by the tracing points on the chart. The tracing points may be arranged to plot current flow lines on the chart at right angles to lines of equipotential discovered by the contacts of the probe.

A more comprehensive concept of my invention may be had from the following detailed description, taken in conjunction with the accompanying drawings in which:

Fig. 4 is a diagram illustrating a modified form of linkage between probe and marker; and Fig. 5 is an isopachous map of the oil bearing formation of Fig. 4, with flow lines thereon constructed in accordance with the invention.

Figure 1:
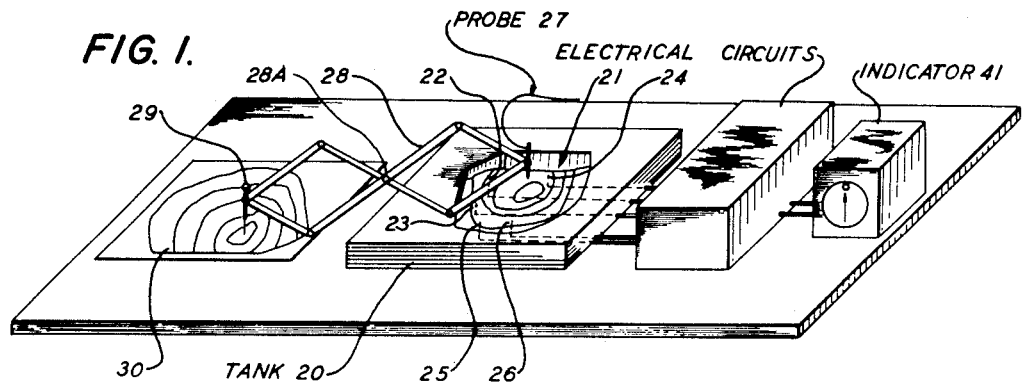
Fig. 1 is a pictorial view of a simple form of the apparatus of the invention equipped with a single probe or contact and a single marker or tracing point with a pantograph linking the two.
Figure 2:
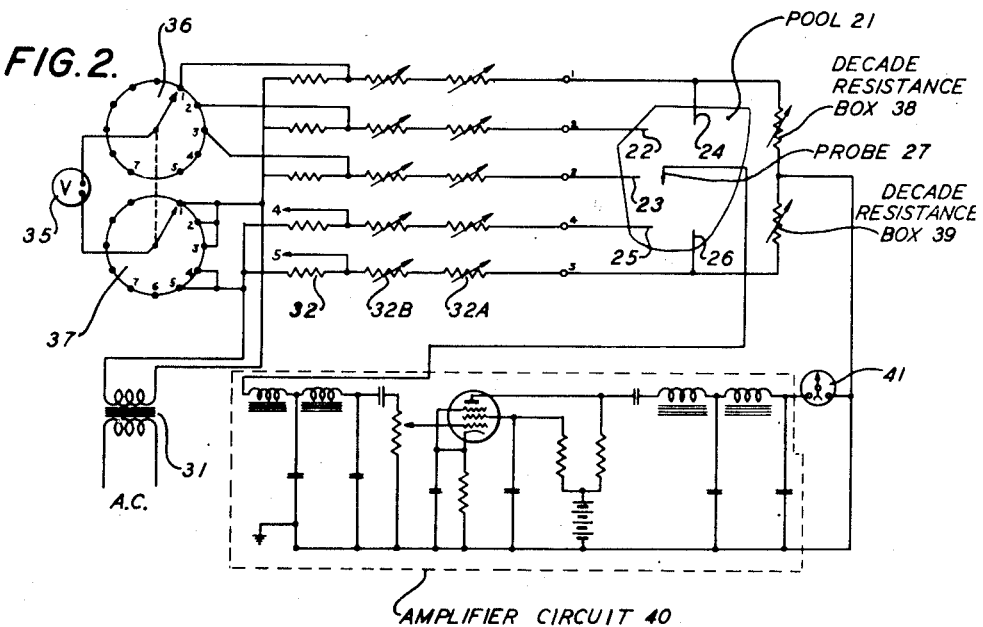
Fig. 2 is a wiring diagram illustrating an electrical circuit for use with the apparatus of Fig. 1.

The apparatus of Figs. 1 and 2 employs a wooden tank 20 made up of a series of plywood laminations. The interior or basin 21 of the tank is shaped to correspond to a wet gas field undergoing investigation, its interior being sealed by a waterproof insulating varnish coated with a layer of wax. Electrodes 22, 23, 24 representing injection wells and electrodes 25, 26 representing extraction wells are $\frac{1}{16}$ inch diameter copper wires passing through the tank bottom. These electrodes are carefully sealed into the tank to prevent leakage of electrolyte and electrical connections to these electrodes are made on the underside of the tank bottom.

The basin 21 is filled with an electrolyte of relatively low conductivity in order to minimize the effect of contact resistance between the electrodes and the electrolyte. The electrolyte is made up by adding to fifty parts of distilled water, one part of a stock solution prepared as follows:

15 gms. copper sulfate (anhydrous)
5 gms. sulfuric acid
5 gms. ethyl alcohol
100 gms. distilled water The current at any electrode should be kept low enough to avoid formation of gas bubbles thereon with resultant increase in contact resistance and shift of equipotential lines. It has been found that currents of the order of .04 ampere per electrode can be tolerated without appreciable effect from gas bubbling with an electrode depth of one inch. Larger diameter electrodes or greater electrode depth permit larger currents.

A probe 27 in the form of an electrical conductor is mounted on the end of a system of levers arranged as a one-to-one pantograph 28 having a fixed pivot 28A. The other end of the pantograph carries a tracer point 29 disposed above an isopachous map 30 corresponding to the gas field represented by the electrolytic model 20. The map is so disposed that when the probe occupies a given position on the electrolytic model the marker or tracer point occupies a corresponding position on the map.

The electrical details of the system are shown on Fig. 2. Current to the electrodes is supplied by a one-to-one isolation transformer 31 from a 110 volt 60 cycle power line. The three electrodes 22, 23, 24 representing injection wells are connected respectively through suitable variable resistors to one side of the transformer output winding while the two electrodes 25, 26 representing extraction wells are connected to the opposite side of this transformer winding through similar sets of resistors.

The resistances are adjusted in each case to give currents to the electrodes corresponding to the chosen injection or extraction rate, measurement being made by means of a voltmeter 35 which can be connected into any one of the series of resistances by means of single pole multiple throw switches 36, 37.

A potentiometer consisting of two precision decade resistance boxes 38, 39 is connected between the injection electrode 24 and the extraction electrode 26. (In practice, it is best to select for this purpose those electrodes which have the smallest potential drop in the series resistors connecting them to the transformer.)

The probe is connected to the input of a 60 cycle band pass amplifier 40, the ground potential side of which is connected to the potentiometer common point, i. e. the junction of the two decade boxes. The sum of the resistances of the two decade boxes is maintained constant at say 10,000 ohms, but by adjusting the ratio of the two boxes the potential of their common point is set at a desired percentage of the total voltage across the two boxes. The pool of electrolyte is then explored with the probe to locate the equipotential line corresponding to this voltage. When the probe occupies a point on this equipotential line, the input to the amplifier is a minimum as indicated by a null on a galvanometer 41 connected in the output of the amplifier.

Each time that a point on a particular equipotential line is located by the probe in the electrolyte, the tracer point, due to the action of the pantograph, occupies a corresponding point on the map. The tracer point is then depressed to make that position and the operation is repeated until sufficient points on that equipotential line are marked. The setting of the decade boxes is then changed and another equipotential line is similarly located, the points along each line being joined in each case on the map.

Figure 3:
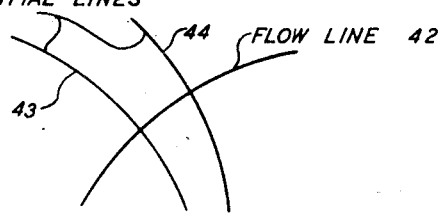
Fig. 3 is a diagram illustrating the relationship of equipotential lines to flow lines.

Once the equipotential lines are constructed, a system of flow lines which are at all points normal to the equipotential lines may be constructed. This is illustrated in Fig. 3 wherein a flow line 42 has been constructed normal to two equipotential lines 43, 44.

After the several flow lines have been constructed, transit time along them may be determined by application of the formula $$\delta t = K \frac{(\delta X)^2}{\delta V}$$

where $t$ is transit time, $K$ is a constant, $X$ is distance along the flow line, and $V$ is potential at any point along the flow line.

In this practice of the invention $\delta X$ is measured along the flow line between two successive points at which potential has been determined so that the potential drop $\delta V$ between them is known. For example, if $\delta X$ is 1 cm. and $\delta V$ is .05 volt, $\delta t$ or transit time between the two points is $$\frac{K \cdot (1)^2}{.05} \text{ or } 20K$$

By locating points of equal transit time on each line and joining together these points an "invasion front" may be plotted for the gas field for the particular set of extraction and injection rates.

A pantograph is only one of a number of types of mechanical linkages that may be employed to trace on the map points corresponding respectively to those located on the electrolytic model with the probe. Another form of linkage is illustrated in Fig. 4. It comprises an electrolytic model 45 in the form of a basin of insulating material shaped to correspond to the system undergoing investigation, say a wet gas field, and containing a pool of electrolyte. Electrodes 46, 47, 48 corresponding to extraction wells and an electrode 50 corresponding to an injection well, project into the pool from the bottom and receive current from a source 51, connected between them. The extraction electrodes are in parallel.

A vertical probe 52 is supported above the pool in contact therewith and is mounted on one end of a horizontal arm or longitudinal slider 53. The other end of the arm carries a vertical marker 54. A chart or map 55 corresponding to the model in shape and orientation is disposed below the marker head.

The arm 53 is slidable longitudinally in a holder or lateral slider 56 which rests on a horizontal supporting rail 57 running at right angles to the arm. The holder slides along the rail, so that the probe may be moved to any portion of the pool with the marker occupying a corresponding position above the chart.

As in the case of the apparatus of Figs. 1 and 2, means is provided for determining the potential found by the probe at any point in the pool of electrolyte. Thus a potentiometer 58 consisting of two adjustable resistances 58A, 58B in series is connected between the injection electrode 50 and one of the extraction electrodes 46. The probe is connected to the common point of the potentiometer through a galvanometer 59.

Adjustment of potentials at the extraction electrodes to simulate any desired set of extraction rates at the corresponding wells may be accomplished by means of variable resistances 60, 61, 62, connected respectively to the extraction electrodes 46, 47, 48.

The operation of the apparatus of Fig. 4 is the same as that of Figs. 1 and 2. The sum of the resistances in the potentiometer is kept constant, but by adjusting the ratio of the two, the potential of their common point is set at a desired percentage of the total potential drop across the two resistances. With current flowing through the electrodes of the model and with the resistances associated with the electrodes adjusted to simulate any selected set of field operating conditions, the pool of the model is explored with the probe to locate the equipotential line corresponding to the percentage voltage drop at which the midpoint is set. When the probe occupies a point on this equipotential line the galvanometer will read a minimum value.

To consider a specific application of the invention to the mapping of conditions in a wet gas field, reference is made to Fig. 5. This is a plan view of the isopachous map or chart 55 of Fig. 4, with the positions of the extraction wells indicated by points 46A, 47A, 48A, and the positions of the injection well indicated by the point 50A. For a given set of flow conditions, as established by the potential gradients set between the corresponding electrodes, a plurality of equipotential lines are plotted. Actually, the number of equipotential lines plotted is greater than shown, the others having been eliminated in the interests of simplicity. Flow lines are then constructed perpendicular to the equipotential lines. Transit times along the several flow lines are then computed as described above, and points of equal transit time are connected together to establish so-called "dry gas invasion fronts." These latter show the extent of invasion of the dry gas for the assumed set of conditions at the end of the particular transit time selected.

By readjusting the potential flow between injection and extraction electrodes a number of times to simulate a corresponding set of assumed injection and extraction rates for the actual wells, and plotting invasion fronts as described above each time, the effect of various exploitation procedures may be determined in advance and that plan chosen which will give optimum recovery. In short, the life history of a wet gas field under any number of selected exploitation procedures may be investigated in advance of exploitation to determine which one is best.

I claim:

In apparatus for determining the condition of a system in which force operates at least approximately in accordance with Laplace's equation and having a three dimensional electrically conductive model analogous to the system to be investigated, with a conductive probe in contact with the model and a marker disposed adjacent a chart spaced from the model and a linkage connecting the marker to the probe for moving the marker on the chart to correspond to movement of the probe on the model, said linkage comprising an elongated arm carrying the marker and the probe at its opposite ends, an elongated supporting rail disposed between the model and the chart at a right angle to the arm, and a slider slidably supporting the arm to permit longitudinal movement of the arm and slidably mounted on the rail to move longitudinally of the rail.

ALEXANDER WOLF.

REFERENCES CITED

The following references are of record in the file of this patent:

UNITED STATES PATENTS

| Number | Name | Date |
| --- | --- | --- |
| 1,825,855 | Craig | Oct. 6, 1931 |
| 1,919,215 | Gunn | July 25, 1933 |
| 2,368,217 | Hayes | Jan. 30, 1945 |
| 2,382,093 | Phelan | Aug. 14, 1945 |
| 2,440,693 | Lee | May 4, 1948 |

OTHER REFERENCES

Electron Optics—Theoretical and Practical—by Myers. Published by D. Van Nostrand Co. Pages 122 to 142 inclusive. (A copy is available in Division 54.)

Text Book—Geophysical Exploration—by Heiland 1940—chapter 10, pages 681–706. (Copy of this text in Division 48.)